US009557894B2

(12) United States Patent
Nishihashi

(10) Patent No.: US 9,557,894 B2
(45) Date of Patent: Jan. 31, 2017

(54) DISPLAY SYSTEM, DISPLAY APPARATUS, MANIPULATION APPARATUS AND FUNCTION SELECTION APPARATUS

(71) Applicant: DENSO CORPORATION, Kariya, Aichi-pref. (JP)

(72) Inventor: Shigeaki Nishihashi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 149 days.

(21) Appl. No.: 13/721,624

(22) Filed: Dec. 20, 2012

(65) Prior Publication Data
US 2013/0167077 A1 Jun. 27, 2013

(30) Foreign Application Priority Data
Dec. 23, 2011 (JP) ................................. 2011-282490

(51) Int. Cl.
*G06F 3/0488* (2013.01)
*G06F 3/0484* (2013.01)
*G06F 3/0481* (2013.01)

(52) U.S. Cl.
CPC .......... *G06F 3/0484* (2013.01); *G06F 3/0481* (2013.01); *G06F 3/04842* (2013.01); *G06F 3/04886* (2013.01); *G06F 2203/04803* (2013.01)

(58) Field of Classification Search
CPC G06F 3/0481; G06F 3/04842; G06F 3/04886; G06F 2203/04803
USPC ................................. 715/800, 792; 345/177
See application file for complete search history.

(56) References Cited

U.S. PATENT DOCUMENTS

| 6,538,670 | B1  |   | 3/2003  | Kido |            |
|-----------|-----|---|---------|------|------------|
| 2004/0263491 | A1 | * | 12/2004 | Ishigaki | .................. 345/177 |
| 2006/0119588 | A1 | * | 6/2006 | Yoon et al. | .................. 345/173 |
| 2008/0119237 | A1 | * | 5/2008 | Kim | ............................. 455/566 |
| 2009/0007001 | A1 | * | 1/2009 | Morin | .................. G06F 3/0237 715/773 |

(Continued)

FOREIGN PATENT DOCUMENTS

| JP | 2000-214977 | 8/2000 |
| JP | 2008-186279 | 8/2008 |

(Continued)

OTHER PUBLICATIONS

Gordon, "How to Get Mac OS X's Best Features on Windows", Jun. 1, 2011, [retrieved from the Internet on Oct. 18, 2014], <URL http://lifehacker.com/5807358/how-to-get-mac-os-xs-best-features-on-windows/>, p. 1-10.*

*Primary Examiner* — Ajay Bhatia
*Assistant Examiner* — Mong-Shune Chung
(74) *Attorney, Agent, or Firm* — Harness, Dickey & Pierce, P.L.C.

(57) ABSTRACT

A display system includes a screen panel, an input unit, a switch section, and a resizing section. The screen panel switches a display mode between a window selection mode and a function selection mode. The input unit includes an input panel arranged apart from the screen panel, and defines an arrangement of input regions corresponding to an arrangement of display windows displayed in the window selection mode of the screen panel. When a target input region is manipulated, the switch section sets the target input region as a selected input region, and the resizing section enlarges a size of the selected input region and rearranges an enlarged selected input region on the input panel.

16 Claims, 7 Drawing Sheets

(56) References Cited

U.S. PATENT DOCUMENTS

2010/0103127 A1* 4/2010 Park et al. .................. 345/173
2010/0231550 A1* 9/2010 Cruz-Hernandez et al. . 345/174
2010/0313156 A1* 12/2010 Louch et al. ................ 715/769
2013/0007653 A1* 1/2013 Stolyarov et al. ............ 715/784

FOREIGN PATENT DOCUMENTS

| JP | 2009-294720 | 12/2009 |
| JP | 2010-020520 | 1/2010 |
| JP | 2010-039985 | 2/2010 |
| JP | 2010-102508 | 5/2010 |
| JP | 2011-086033 | 4/2011 |

* cited by examiner

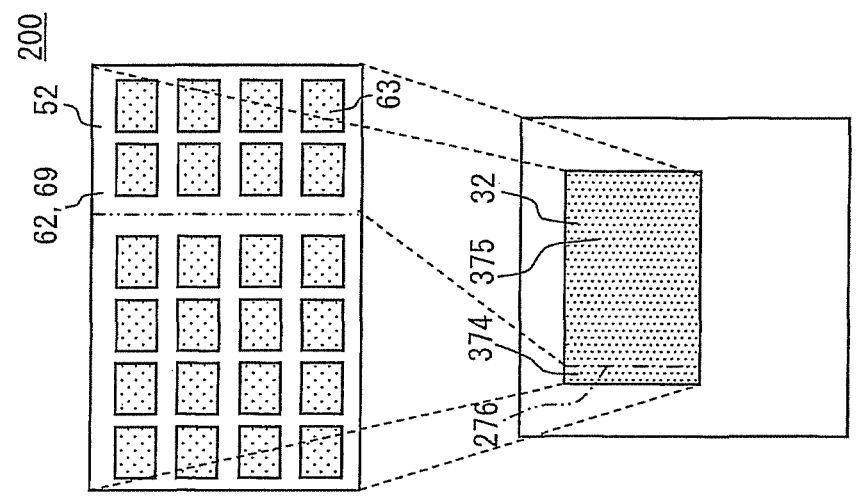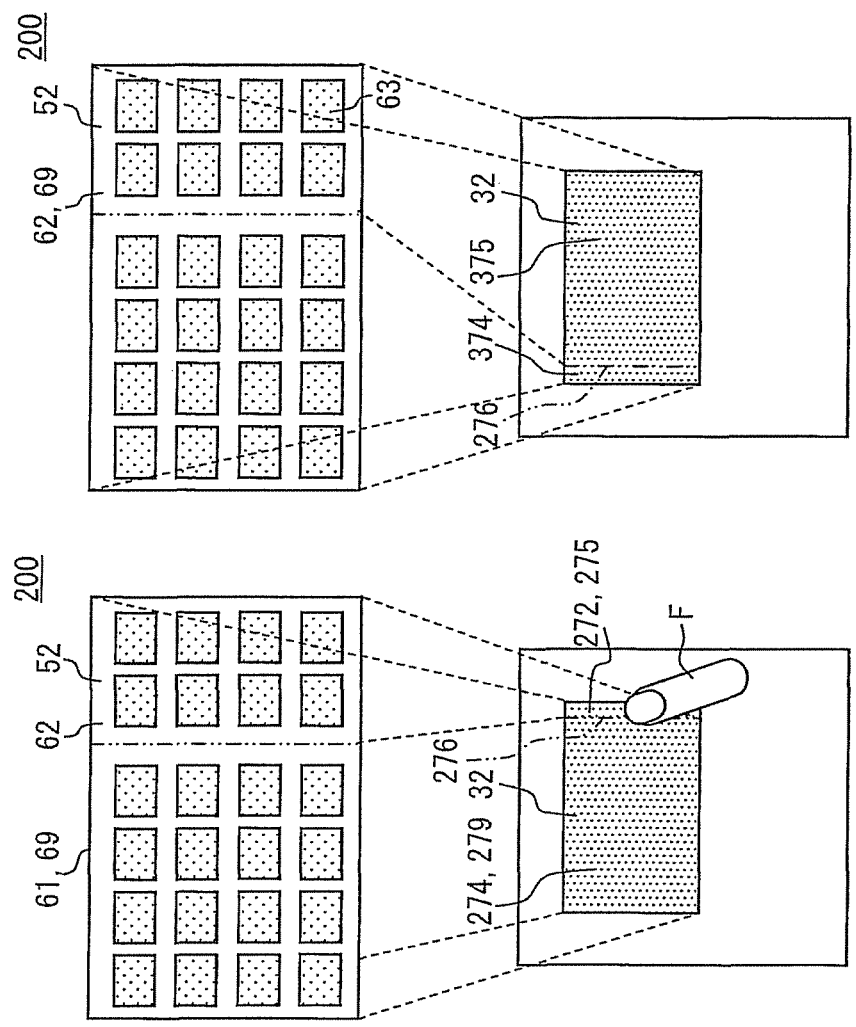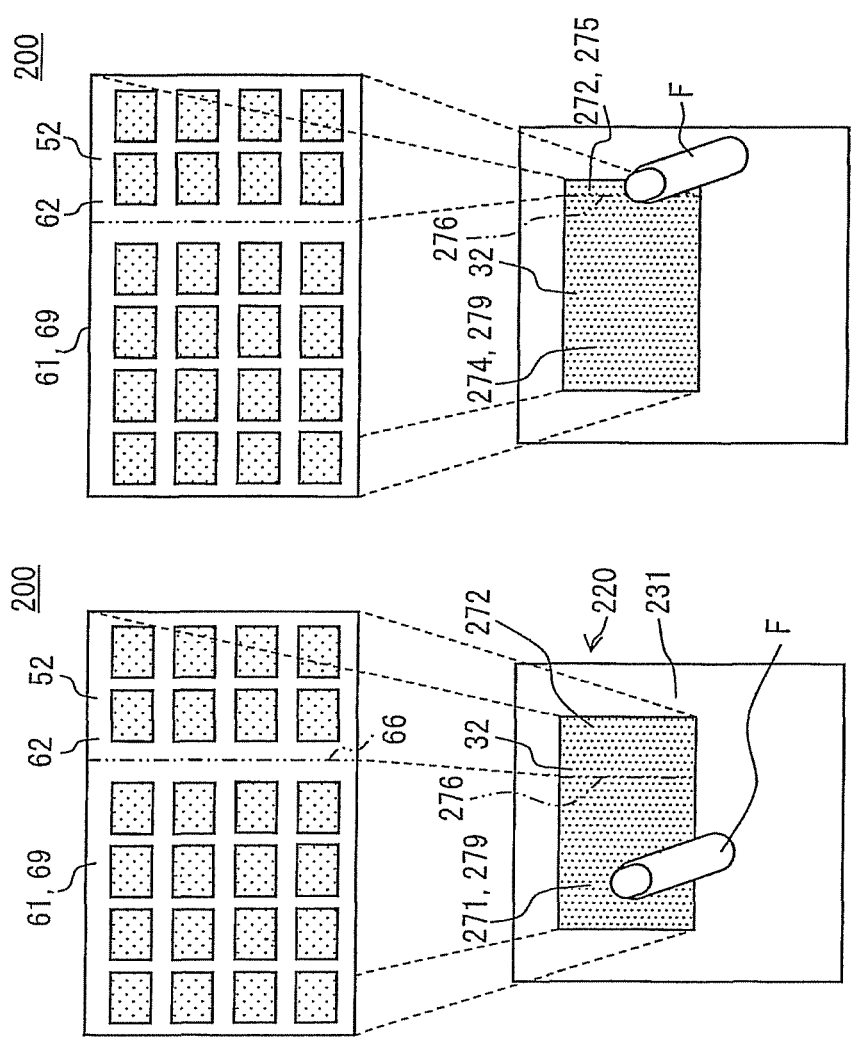

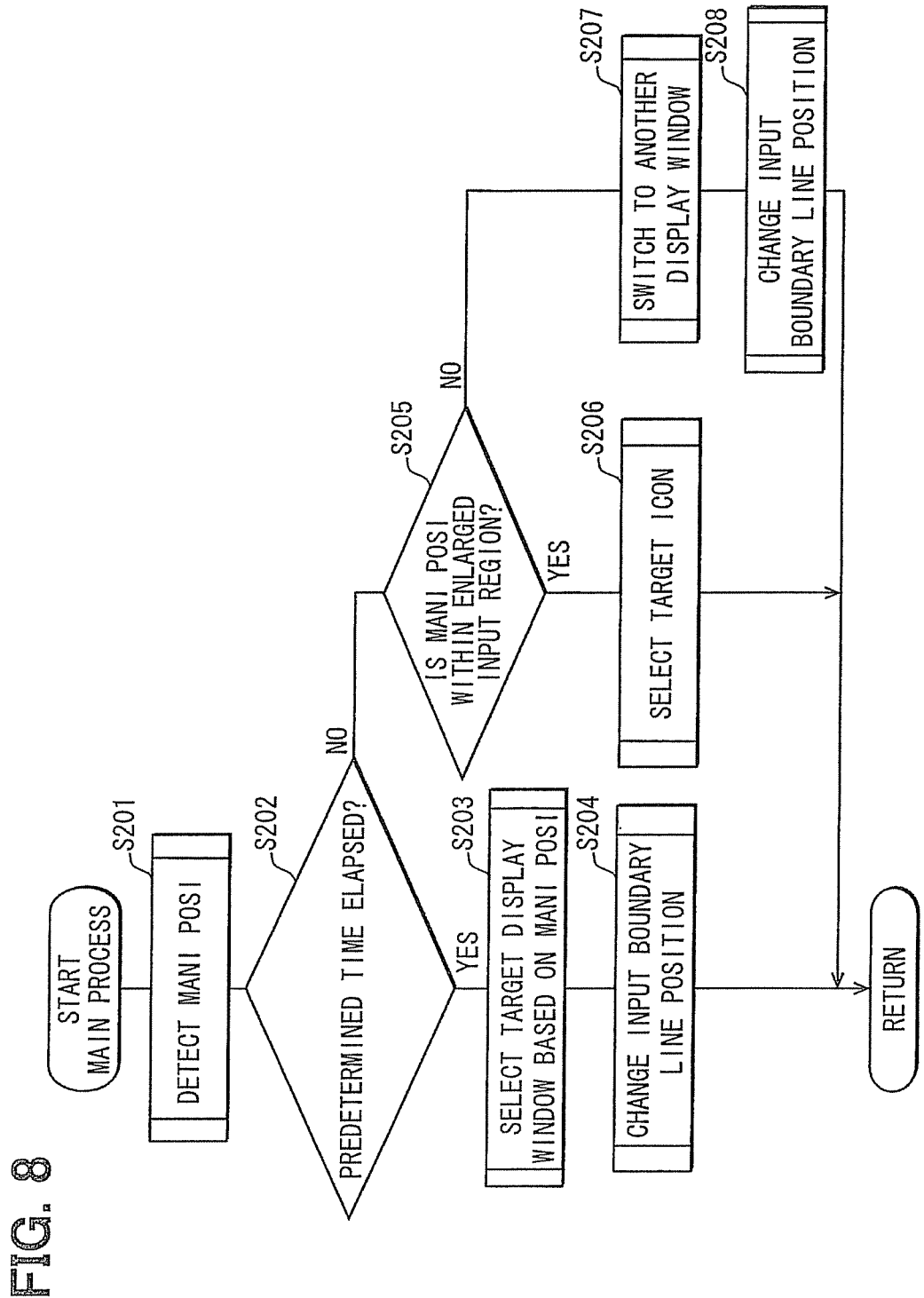

US 9,557,894 B2

DISPLAY SYSTEM, DISPLAY APPARATUS, MANIPULATION APPARATUS AND FUNCTION SELECTION APPARATUS

CROSS REFERENCE TO RELATED APPLICATION

This application is based on Japanese Patent Application No. 2011-282490 filed on Dec. 23, 2011, the disclosure of which is incorporated herein by reference.

TECHNICAL FIELD

The present disclosure relates to a display system, which selects a target button image displayed on a screen panel based on a manipulation on an input panel, a display apparatus and a manipulation apparatus included in the display system, and a function selection apparatus.

BACKGROUND

Conventionally, as disclosed in JP 2008-186279 A, a display system includes a display unit and a touchpad. In the display system disclosed in JP 2008-186279 A, the display unit displays icons, each of which is linked to a corresponding predetermined function, on a screen panel, and the touchpad is manipulated by a user to select a target icon displayed on the display unit. Further, JP 2000-214977 A (corresponding to U.S. Pat. No. 6,538,670 B1) discloses a display system including a display unit and keys. The display unit displays display windows on a screen panel of the display unit, and each key is used to select a corresponding display window displayed on the screen panel. An arrangement of the keys corresponds to an arrangement of the display windows. When one of the keys is manipulated by a user, a corresponding display window is selected and is displayed on the screen panel in an enlarged manner.

Recently, a screen panel of a display system tends to turn into a high-definition screen panel and a size of the screen panel tends to increase. When the display unit of the display system disclosed in JP 2008-186279 A displays an image on a high-definition screen panel, a size of each icon displayed on the screen panel will be reduced. For example, the icons may include button images. When a size of the screen panel is enlarged and a size of the touchpad remains the same, a ratio of the size of the touchpad to the size of the screen panel reduces. Thus, when the user manipulates the touchpad to select a target icon displayed on the screen panel, it is difficult for the user to accurately manipulate the touchpad to select the target icon displayed on the screen panel. Thus, a manipulation time for selecting the target icon displayed on the screen panel increases.

In view of the foregoing difficulties in JP 2008-186279 A, the inventor of the present disclosure thought of adding keys disclosed in JP 2000-214977 A for selecting corresponding display windows to the display system disclosed in JP 2008-186279 A. In a display system which has a combined structure of JP 2008-186279 A and JP 2000-214977 A, each display window is selected by manipulating a corresponding key. Further, an icon is selected by manipulating of the touchpad. With this configuration, a manipulation switch becomes complicated. Specifically, when the user switches from a manipulation to the key to select the display window to a manipulation to the touchpad to select the target icon, the user needs to change a manipulation position from the keys to the touchpad. Thus, it is difficult for the user to reduce a manipulation time for selecting the target icon displayed on the screen panel of the display system, which has the combined structure of JP 2008-186279 A and JP 2000-214977 A.

SUMMARY

In view of the foregoing difficulties, it is a first object of the present disclosure to provide a display system, which reduces a manipulation time for selecting a target button image. It is a second object of the present disclosure to provide a display apparatus, which reduces a manipulation time for selecting a target button image. It is a third object of the present disclosure to provide a manipulation apparatus, which reduces a manipulation time for selecting a target button image. It is a fourth object of the present disclosure to provide a function selection apparatus, which reduces a manipulation time for selecting a target button image.

According to a first aspect of the present disclosure, a display system includes a screen panel, an input unit, a switch section, and a resizing section. The screen panel switches a display mode between a window selection mode and a function selection mode. The screen panel displays a plurality of display windows in the window selection mode for a selection of a target display window from the display windows, and displays a plurality of button images included in the target display window in the function selection mode for a selection of a target button image from the button images. Each of the button images is linked to a corresponding predetermined function. The input unit includes an input panel that is arranged apart from the screen panel. The input panel defines an arrangement of a plurality of input regions. The arrangement of the input regions corresponds to an arrangement of the display windows in the window selection mode. One of the input regions corresponding to the target display window is referred to as a target input region. When the target input region is manipulated by a user, the switch section sets the target input region as a selected input region, sets the target display window as a selected display window, and switches the display mode from the window selection mode to the function selection mode in which the target display window is set as the selected display window. The resizing section enlarges a size of the selected input region on the input panel, and rearranges an enlarged selected input region on the input panel when the switch section switches the display mode from the window selection mode to the function selection mode.

In the above display system, a manipulation time for selecting a target button image is reduced.

According to a second aspect of the present disclosure, a display apparatus included in the display system according to the first aspect includes the screen panel, the switch section, and the resizing section.

In the above display apparatus, an advantage similar to the advantage provided by the display system according to the first aspect is provided.

According to a third aspect of the present disclosure, a manipulation apparatus included in the display system according to the first aspect includes the input panel, the switch section, and the resizing section.

In the above manipulation apparatus, an advantage similar to the advantage provided by the display system according to the first aspect is provided.

According to a fourth aspect of the present disclosure, a function selection apparatus includes a touchpad, a display controller, and a manipulation controller. The function selection apparatus selects a target button image from a plurality of button images displayed on a screen panel. The button images are classified into a plurality of groups of button images and each button image is linked to a corresponding predetermined function. The touchpad is arranged apart from the screen panel and receives manipulation information when the touchpad is touched by a user. The display controller controls the screen panel to display a plurality of display windows. Each of the display windows includes a corresponding group of the button images. The manipulation controller detects the manipulation information received by the touchpad. The manipulation controller includes a first defining section, a second defining section, and a determination section. The first defining section determines an arrangement of a plurality of window input regions on the touchpad. Each of the window input regions is touched for selecting a corresponding display window from the display windows displayed on the screen panel. One of the window input regions that is touched by the user is referred to as a selected window input region and one of the display windows that corresponds to the selected window input region is referred to as a selected display window. When the one of the window input regions is touched by the user, the second defining section extracts one of the groups of the button images included in the selected display window based on the manipulation information received by the touchpad and switches the arrangement of the window input regions on the touchpad to an arrangement of a plurality of function input regions. Each of the function input regions is touched for selecting one of the button images included in the selected display window. The determination section determines whether the one of the button images included in the selected display window is selected by the user.

In the above function selection apparatus, an advantage similar to the advantage provided by the display system according to the first aspect is provided.

BRIEF DESCRIPTION OF THE DRAWINGS

The above and other objects, features and advantages of the present disclosure will become more apparent from the following detailed description made with reference to the accompanying drawings. In the drawings:

FIG. 7A is a diagram showing a screen panel and an input panel in a window selection mode according to a second embodiment, FIG. 7B is a diagram showing the screen panel and the input panel in a first function selection mode, which is switched from the window selection mode shown in FIG. 7A, and FIG. 7C is a diagram showing the screen panel and the input panel in a second function selection mode, which is switched from the first function selection mode shown in FIG. 7B; and FIG. 8 is a flowchart showing a main process executed by a manipulation controller of the display system according to a second embodiment.

DETAILED DESCRIPTION

Figure 1:
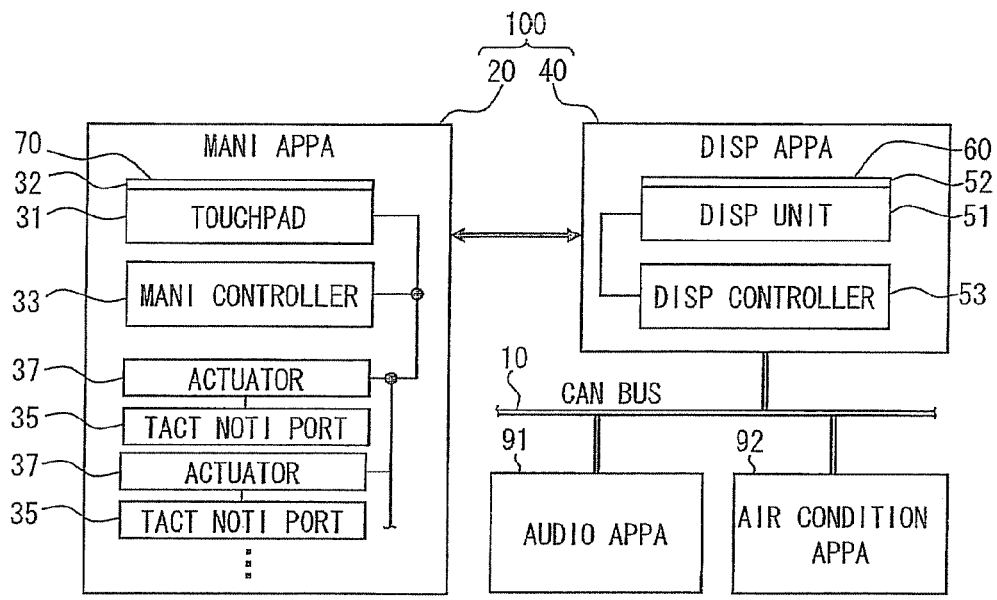
FIG. 1 is a block diagram showing a configuration of a display system according to a first embodiment of the present disclosure.

The following will describe embodiments of the present disclosure with reference to the drawings. In each of the following embodiments, the same reference number is added to the same or equivalent parts in the drawings. In each of the following embodiments, when only a part of a configuration, instead of all of the configuration, is described, the other part of the configuration may have a similar or the equivalent configuration with which is previously described in the foregoing embodiments.

First Embodiment

Figure 2:
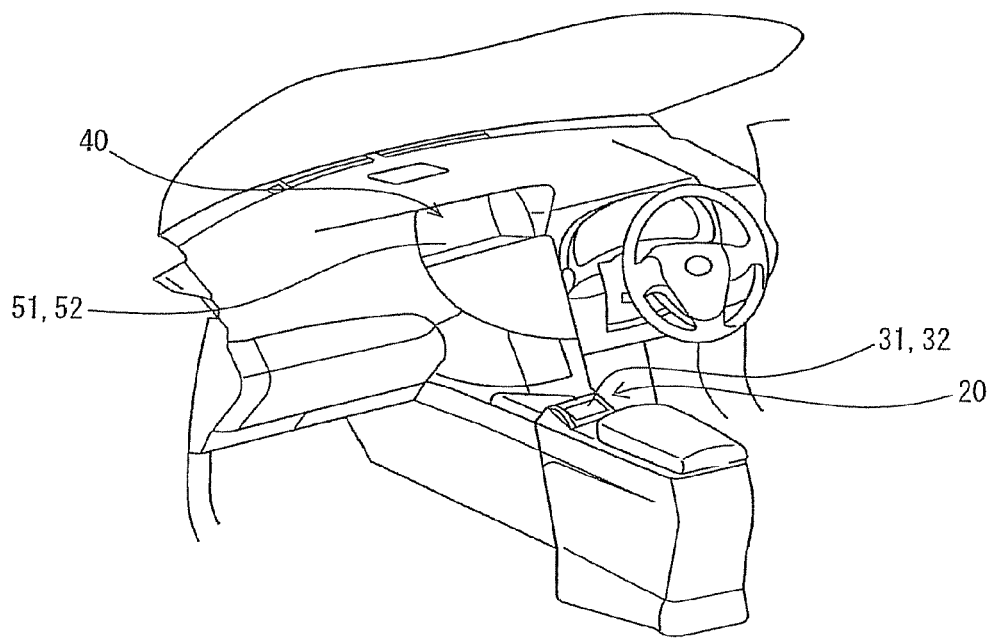
FIG. 2 is a diagram showing a position of a screen panel and a position of an input panel of an input unit in a vehicle.
Figure 3:
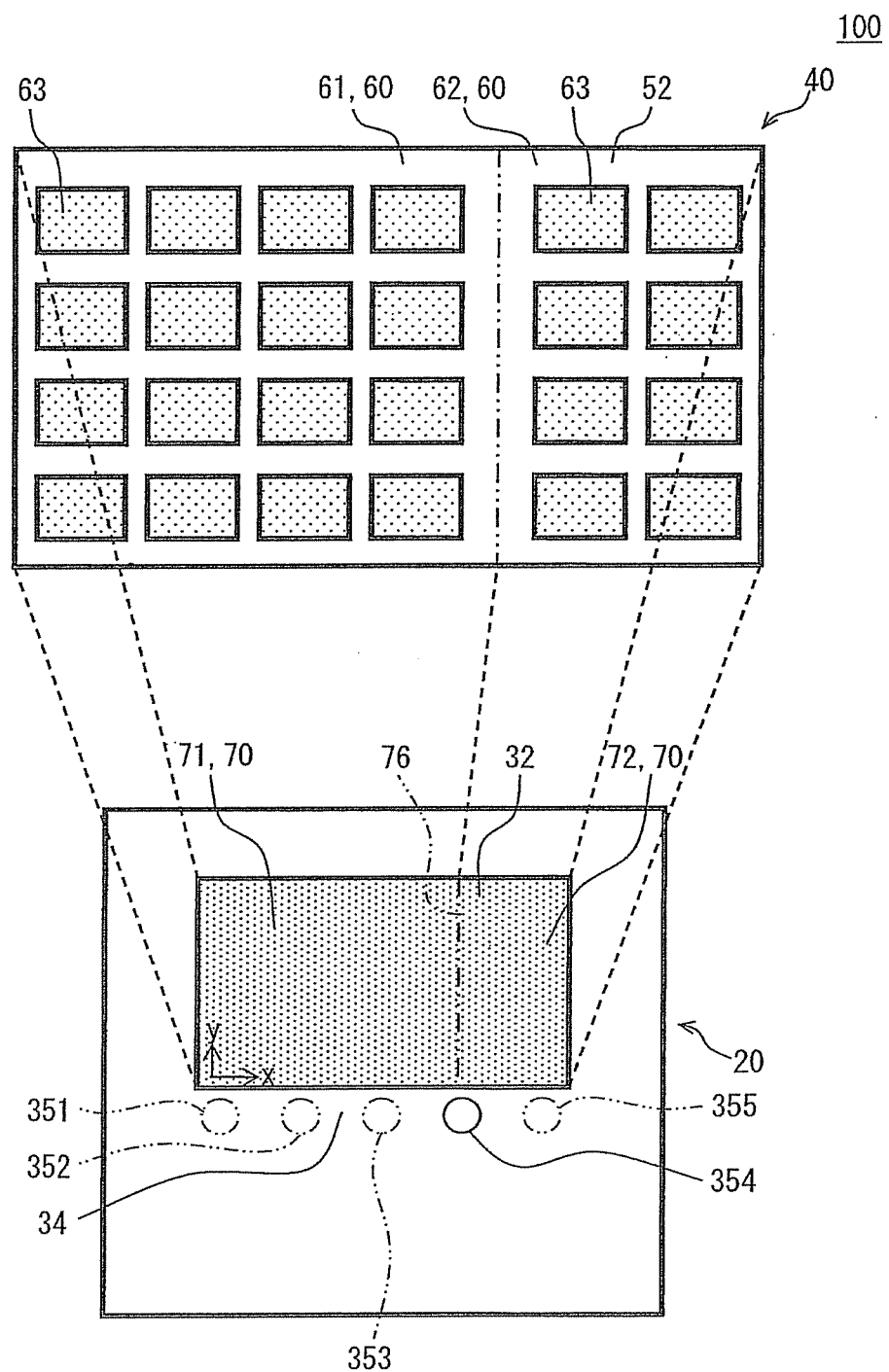
FIG. 3 is a diagram showing an image displayed on the screen panel and a correspondence relationship between the screen panel and the input panel.

As shown in FIG. 1, a display system 100 according to the present embodiment includes a manipulation apparatus (MANI APPA) 20 and a display apparatus (DISP APPA) 40. As shown in FIG. 2, the manipulation apparatus 20 is arranged in a vehicle so that a touchpad panel 32 of a touchpad 31 of the manipulation apparatus 20 is exposed to be touched by a user. Hereinafter, the touchpad 31 is also referred to as an input unit, and the touchpad panel 32 of the touchpad 31 is also referred to as an input panel. The touchpad 31 of the manipulation apparatus 20 is arranged within an easily reachable range of the user by a hand. The touchpad 31 may be arranged at a center console of the vehicle. The display apparatus 40 is arranged in the vehicle so that a screen panel 52 of the display apparatus 40 faces the user so that the screen panel 52 is viewable by the user. For example, the screen panel 52 is equipped to an instrument panel of the vehicle so that the screen panel 52 is viewable from a driver seat of the vehicle. As shown in FIG. 3, the display system 100 controls the screen panel 52 to display an image. The following will describe the image, which is displayed on the screen panel 52, in detail.

As shown in FIG. 3, the image displayed on the screen panel 52 includes icons 63, each of which is linked to a corresponding predetermined function. For example, each icon 63 has a rectangular shape. Further, each icon 63 may be a character, which indicates the predetermined function, or a figure, which is associated with the corresponding predetermined function linked to each icon 63. A position on the screen panel 52 corresponds to a position on the touchpad panel 32. Thus, when the user manipulates on a predetermined position of the touchpad panel 32, a target icon 63 placed at a position of the screen panel 52, which corresponds to the predetermined position of the touchpad panel 32, is selected so that the display apparatus 40 executes a predetermined process, which is linked to the target icon 63. When manipulating on the touchpad panel 32, the user may tap on the touchpad panel 32 with a finger. Further, the user may press on the touchpad panel 32 or touch on the touchpad panel 32 and the like.

As shown in FIG. 3, a display controller 53 of the display apparatus 40 controls the screen panel 52 to display one or more display windows 60, which are also referred to as display regions 60. In the present embodiment, the display windows 60 include a first display window 61 and a second display window 62 arranged in a horizontal direction, which is also referred to as an x-direction. The second display window 62 is arranged adjacent to the driver seat, and has a size smaller than a size of the first display window 61.

As shown in FIG. 3, a manipulation controller 33 defines input regions 70 on the touchpad panel 32 so that the input regions 70 correspond to the display windows 60 displayed on the screen panel 52. That is, an arrangement of the input regions 70 corresponds to an arrangement of the display windows 60. In the present embodiment, the input regions 70 include a first input region 71 and a second input region 72 arranged in the horizontal direction. The first input region 71 corresponds to the first display window 61, and the second input region 72 corresponds to the second display window 62. The second input region 72 is arranged adjacent to the driver seat, and has a size smaller than a size of the first input region 71. In the present disclosure, a manipulation position on the touchpad panel 32 may correspond to a position on the screen panel 52 in an absolute corresponding manner or in a relative corresponding manner. Specifically, in the absolute corresponding manner, when the screen panel 52 is reduced to have the same size with the touchpad panel 32, the manipulation position on the touchpad panel 32 fully matches with the corresponding position on the screen panel 52. Further, in the relative corresponding manner, when the screen panel 52 is reduced to have the same size with the touchpad panel 32, the manipulation position on the touchpad panel 32 does not fully match with the corresponding position on the screen panel 52.

The following will describe a configuration of the display system 100 with reference to FIG. 1 and FIG. 2. The manipulation apparatus 20 is arranged apart from the display apparatus 40 by a predetermined distance. When the manipulation apparatus 20 is manipulated by the user, the manipulation apparatus 20 transmits a signal to the display apparatus 40 to select the target icon 63 displayed on the screen panel 52 as shown in FIG. 3. Thus, the user selects the target icon 63 via a remote manipulation on the touchpad panel 32. The manipulation apparatus 20 is coupled to the display apparatus 40, and transmits manipulation information, which indicates that the touchpad panel 32 is manipulated by the user, to the display apparatus 40. The manipulation information will be described later in detail. As shown in FIG. 1, the manipulation apparatus 20 includes the touchpad 31, a manipulation controller (MANI CONTROLLER) 33, tactile notification portions (TACT NOTI PORT) 35, and actuators (ACTUATOR) 37 respectively corresponding to the tactile notification portions 35.

The touchpad 31 is a well-known capacitance-based touchpad and a detailed configuration of the touchpad 31 will be omitted. The touchpad 31 includes the touchpad panel 32 and electrodes arranged at an internal side of the touchpad panel 32. The touchpad panel 32 may have a rectangular plate shape. The touchpad 31 detects a manipulation on the touchpad panel 32. The touchpad panel 32 has an insulation sheet, which is arranged on a surface of the touchpad panel 32 and is made of insulation material. The electrodes, which are arranged at the internal side of the touchpad panel 32, are covered by the insulation sheet. The electrodes, which are arranged in a latticed manner, include x-direction electrodes arranged in the x-direction and y-direction electrodes arranged in a y-direction, which is perpendicular to the x-direction. Each of the electrodes is coupled to the manipulation controller 33.

The manipulation controller 33 includes a processor, a random access memory (RAM), and a flash memory. The processor executes instructions of a program to perform a predetermined operation. The RAM provides a processing memory, which is necessary for the processor to execute the instructions. The flash memory stores the instructions of the program, which are to be executed by the processor. Further, the manipulation controller 33 includes a communication interface, which performs a communication with the display apparatus 40. Further, the manipulation controller 33 is coupled to the electrodes of the touchpad 31 and the actuators 37 of the touchpad 31.

Figure 4A:
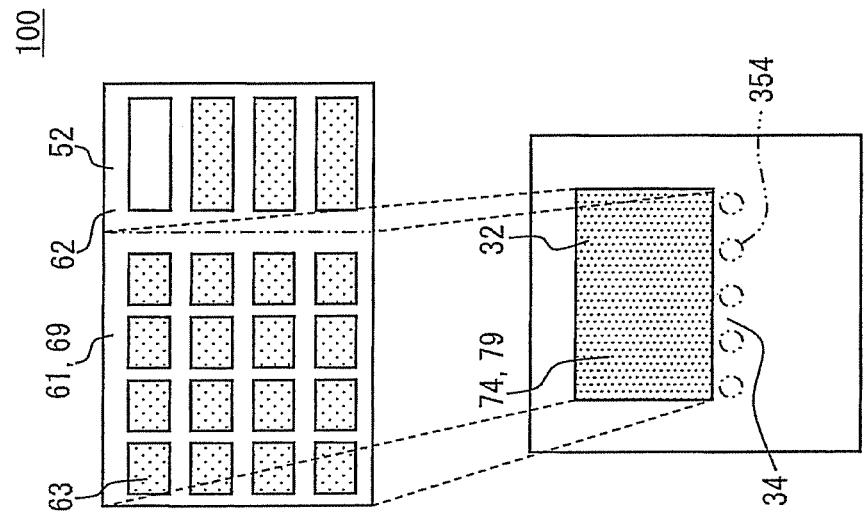
FIG. 4A is a diagram showing the screen panel and the input panel in a window selection mode.

The manipulation controller 33 measures an electric potential of each electrode of the touchpad 31 and transmits a control signal to a corresponding actuator 37 by executing a predetermined program. As shown in FIG. 4A, when the touchpad panel 32 is manipulated by a finger F of the user, electric charge is accumulated between the finger F and a corresponding electrode arranged at the internal side of the touchpad panel 32 via the insulation sheet. As shown in FIG. 3, the manipulation controller 33, based on a change in the electric potential of each electrode, detects coordinates of a manipulation position on the touchpad panel 32. The coordinates of the manipulation position include an x-coordinate and a y-coordinate. Then, the manipulation controller 33 adds the coordinates of the manipulation position to the manipulation information, and transmits the manipulation information to the display apparatus 40 via the communication interface.

As shown in FIG. 3, the tactile notification portions 35 of the manipulation apparatus 20 are arranged near the touchpad panel 32. In the present embodiment, the tactile notification portions 35 include five tactile notification portions 351, 352, 353, 354, 355. As shown in FIG. 1, each tactile notification portion 35 is coupled to the corresponding actuator 37. Each actuator 37 controls a corresponding tactile notification portion 35 so that the corresponding tactile notification portion 35 protrudes from a surface of a surrounding portion 34 of the touchpad panel 32 or recedes to be parallel to the surface of the surrounding portion 34 of the touchpad panel 32. Each of the tactile notification portions 35 may be arranged on a reference line extending from an input boundary line 76 between two adjacent input regions 70. For example, as shown in FIG. 3, a tactile notification portion 354 may be arranged on a reference line extending from an input boundary line 76 between the first input region 71 and the second input region 72. With this configuration, each tactile notification portion 35 notifies the input boundary line 76 between the two input regions 70 to the user via a tactile sense.

As shown in FIG. 1, each actuator 37 is coupled to the manipulation controller 33. Each actuator 37 includes a movable portion, which extends based on the control signal transmitted from the manipulation controller 33. Each actuator 37 moves the movable portion based on the control signal so that the corresponding tactile notification portion 35, which is supported by the movable portion, protrudes from the surface of the surrounding portion 34 or recedes to be parallel to the surface of the surrounding portion 34 as shown in FIG. 3.

As shown in FIG. 1, the display apparatus 40 is coupled to a control area network (CAN) bus 10. The CAN bus 10 is a communication path of an in-vehicle communication network to which in-vehicle apparatuses are coupled. The CAN bus 10 transmits data among the in-vehicle apparatuses. The display apparatus 40 performs a communication with the in-vehicle apparatuses, which are coupled to the in-vehicle communication network via the CAN bus 10. For example, the display apparatus 40 performs a communication with an audio control apparatus (AUDI APPA) 91, which controls an audio device, and an air condition control apparatus (AIR CONDITION APPA) 92, which controls an air condition in the vehicle. The display apparatus 40 includes the display controller (DISP CONROLLER) 53 and display unit (DISP UNIT) 51, which is provided by a liquid crystal display (LCD) unit.

The display controller 53 includes a processor, a RAM, a graphics processor, and a graphics RAM. The processor executes instructions of a program to perform a predetermined operation. The RAM provides a processing memory, which is necessary for the processor to execute the instructions. The graphics processor executes an image drawing process. The graphics RAM provides a memory, which is necessary for the graphics processor to perform the image drawing processes. Further, the display controller 53 includes a flash memory, a communication interface, and an image output interface. The flash memory stores the instructions of the program, which are to be executed by the processor, and data used in the image drawing process. The communication interface is coupled to the CAN bus 10. The image output interface outputs images processed by the graphics processor to the display unit 51. The display controller 53, based on information acquired from the CAN bus 10 and the manipulation apparatus 20, performs the image drawing processes to generate the image to be displayed on the screen panel 52 as shown in FIG. 3. Then, the display controller 53 outputs image data to the display unit 51 via the image output interface in a sequential manner.

The display unit 51 is a dot matrix display unit, which controls pixels arranged on the screen panel 52 to display a color image. The display unit 51 continuously generates images to be displayed on the screen panel 52 based on the image data sequentially transmitted from the display controller 53. The display unit 51 notifies information to the driver by displaying the images on the screen panel 52.

The display system 100 controls the screen panel 52 to switch a display mode between a window selection mode and a function selection mode. Specifically, the display mode of the screen panel 52 is controlled by the display controller 53 to switch between the window selection mode and the function selection mode. In the window selection mode, the display controller 53 controls the screen panel 52 to display the display windows 60 so that the user selects a target display window 60. In the function selection mode, the display controller 53 controls the screen panel 52 to display the icons 63 included in the target display window 60 so that the user selects the target icon 63 in the target display window 60. The following will describe an operation of the display system 100 to switch the display mode between the window selection mode and the function selection mode with reference to FIG. 4 and FIG. 5.

Figure 4B:
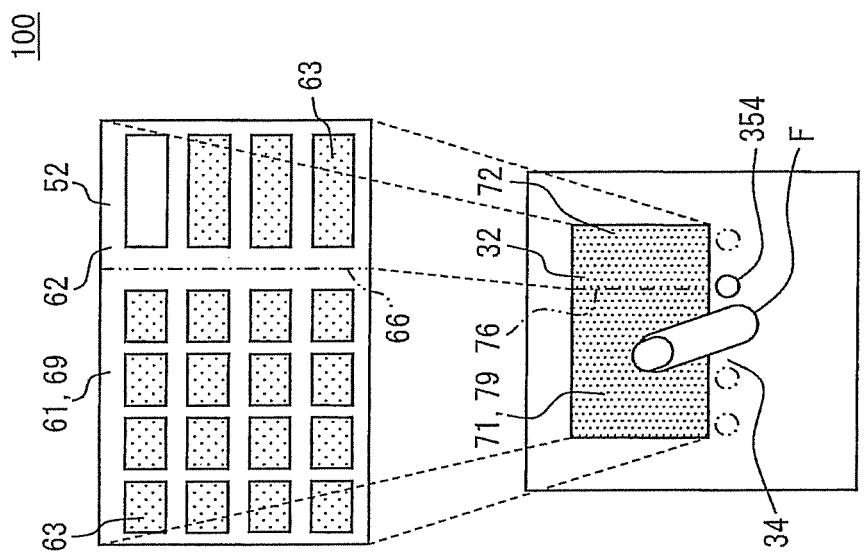
FIG. 4B is a diagram showing the screen panel and the input panel in a function selection mode, which is switched from the window selection mode shown in FIG. 4A.

FIG. 4A shows the screen panel 52 and the touchpad panel 32 in the window selection mode, and FIG. 4B shows the screen panel 52 and the touchpad panel 32 in the function selection mode, which is switched from the window selection mode. For example, the screen panel 52 may display an image for searching a destination in a navigation system. In this case, the first display window 61 displays an image for inputting characters of a name of the destination. Each icon 63 included in the first display window 61 is linked to a corresponding predetermined character. The second display window 62 may display an image for listing destination candidates for search words, which is input by the user. Each icon 63 included in the second display window 62 is linked to a corresponding predetermined destination candidate.

As shown in FIG. 4A, when searching for the destination, in the window selection mode, the size of the second input region 72 is smaller than the size of the first input region 71. As described above, the size of the first input region 71 corresponds to the size of the first display window 61, and the size of the second input region 72 corresponds to the size of the second display window 62. Further, a position of the input boundary line 76 between the first input region 71 and the second input region 72 corresponds to a display boundary line 66 between the first display window 61 and the second display window 62. Further, the tactile notification portion 354 arranged on the reference line extending from the input boundary line 76 protrudes from the surface of the surrounding portion 34.

As described above, in the window selection mode, when the user manipulates the first input region 71 with the finger F, the first input region 71 is selected. Hereinafter, an input region to be manipulated by the user is referred to as a target input region, and when the target input region is manipulated by the user, the target input region is set as a selected input region 79. Correspondingly, a display window that corresponds to the target input region is referred to as a target display window, and when the target input region is manipulated by the user, the target display window is set as a selected display window 69. Thus, when the user manipulates the first input region 71, the first input region 71 is set as the selected input region 79, and the first display window 61, which corresponds to the first input region 71, is set as the selected display window 69. Further, an input region other than the target input region is referred to as a non-target input region, and a display window other than the target display window is referred to as a non-target display window. Further, when the target input region is manipulated by the user, the non-target input region is set as a non-selected input region, and the non-target display window is set as a non-selected display window. When the target input region 70 is manipulated by the user, the display mode of the display system 100 switches from the window selection mode to the function selection mode. The function selection mode includes a first function selection mode in which the first display window 61 is set as the selected display window 69 and a second function selection mode in which the second display window 62 is set as the selected display window 69. In the case shown in FIGS. 4A and 4B, the display mode is switched from the window selection mode to the first function selection mode. After the display mode is switched from the window selection mode to the function selection mode, when the touchpad panel 32 is not manipulated by the user for a predetermined time, the display mode switches back from the function selection mode to the window selection mode.

As shown in FIG. 4B, when the display mode switches from the window selection mode to the function selection mode, the selected input region 79 is enlarged to cover an entire region of the touchpad panel 32. In the case shown in FIG. 4A and FIG. 4B, since the first input region 71 is manipulated by the user, the first input region 71 is enlarged, and an enlarged first input region 74, which covers the entire region of the touchpad panel 32, is rearranged on the touchpad panel 32. That is, the first input region 71 is resized to generate the enlarged first input region 74. With this configuration, the enlarged first input region 74 is generated based on the selected input region 79, which is the first input region 71, so that a manipulation region for selecting the target icon 63 included in the selected display window 69, which is the first display window 61, is enlarged to cover the entire region of the touchpad panel 32. When the selected input region 79 is enlarged to generate the enlarged first input region 74, which covers the entire region of the touchpad panel 32, the tactile notification portion 354 recedes to be parallel to the surface of the surrounding portion 34. With this configuration, the user can select the target icon 63 included in the selected display window 69 using the entire region of the touchpad panel 32. Further, when the display mode switches from the window selection mode to the function selection mode, the size of the first display window 61 and the size of the second display window 62 may remain the same.

Figure 5A:
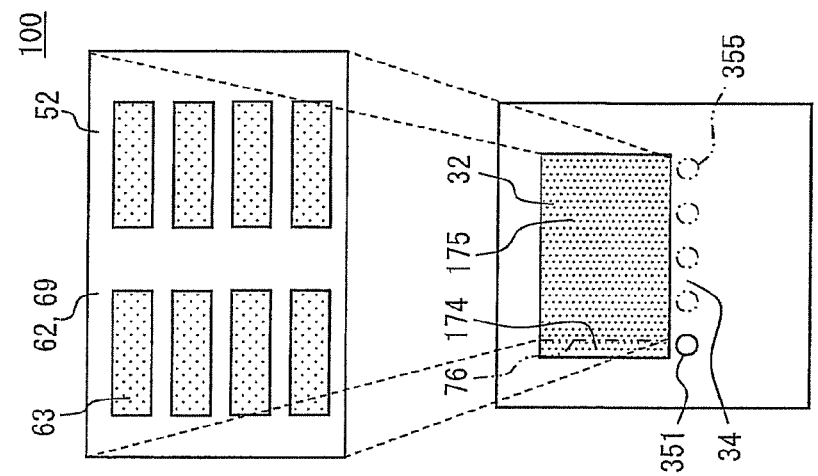
FIG. 5A is a diagram showing the screen panel and the input panel in a window selection mode.
Figure 5B:
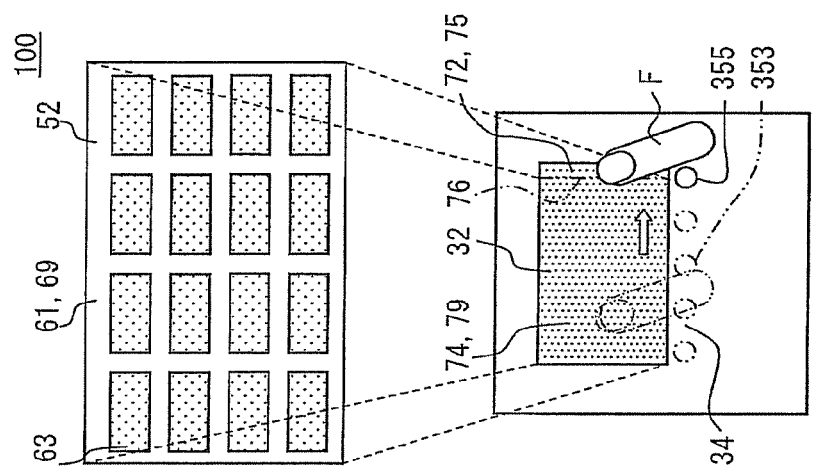
FIG. 5B is a diagram showing the screen panel and the input panel in a first function selection mode, which is switched from the window selection mode shown in FIG. 5A.
Figure 5C:
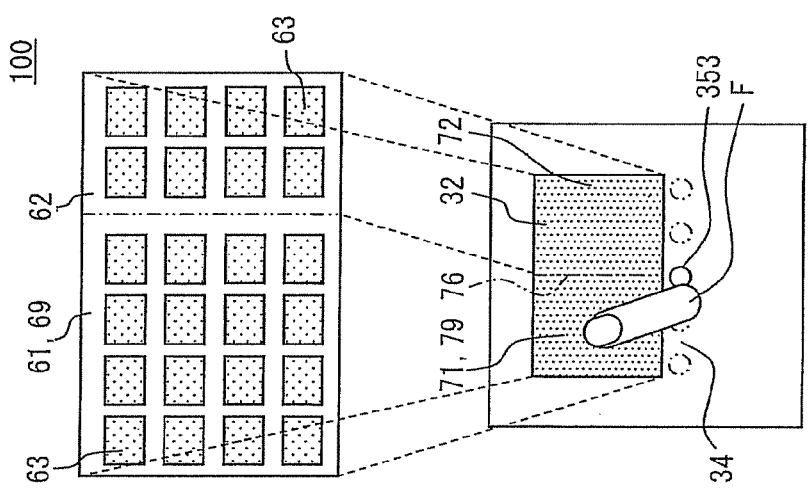
FIG. 5C is a diagram showing the screen panel and the input panel in a second function selection mode, which is switched from the first function selection mode shown in FIG. 5B.

FIG. 5A shows the screen panel 52 and the touchpad panel 32 in the window selection mode, FIG. 5B shows the screen panel 52 and the touchpad panel 32 in the first function selection mode, which is switched from the window selection mode when the first display window 61 is selected, and FIG. 5C shows the screen panel 52 and the touchpad panel 32 in the second function selection mode, which is switched from the first function selection mode when the second display window 62 is selected in the first function selection mode. For example, the first display window 61 may display an image showing a present operation state of the audio control apparatus 91. Each icon 63 included in the first display window 61 is linked to a corresponding function such as volume control and a track selection. The second display window 62 may display an image showing a present operation state of the air condition control apparatus 92. Each icon 63 included in the second display window 62 is linked to a corresponding predetermined function such as a temperature control.

As shown in FIG. 5A, in the window selection mode for displaying the operation states of the in-vehicle apparatuses including the audio control apparatus 91 and the air condition control apparatus 92, the size of the first input region 71 is equal to the size of the second input region 72. Further, the tactile notification portion 353 arranged on a reference line extending from the input boundary line 76 protrudes from the surface of the surrounding portion 34. In this case, the input boundary line 76 is positioned on a center line of the touchpad panel 32.

As described above, in the window selection mode, when the user manipulates the first input region 71 with the finger F, the first input region 71 is set as the selected input region 79. Correspondingly, the first display window 61 is set as the selected display window 69. Further, the display mode switches from the window selection mode to the first function selection mode in which the first display window 61 is set as the selected display window 69.

As shown in FIG. 5A and FIG. 5B, when the display mode is switched from the window selection mode to the first function selection mode, the first input region 71, which is set as the selected input region 79, is enlarged and the enlarged first input region 74 is rearranged on the touchpad panel 32. That is, the first input region 71 is resized to generate the enlarged first input region 74. Further, the second input region 72 is reduced and a reduced second input region 75 is rearranged on the touchpad panel 32. That is, the second input region 72 is resized to generate the reduced second input region 75. The reduced second input region 75 and the enlarged first input region 74 are defined on the touchpad panel 32. Hereinafter, each of the enlarged first input region 74 and the reduced second input region 75 is also referred to as a resized input region 74, 75. When the first input region 71 is enlarged and the second input region 72 is reduced, the position of the input boundary line 76 is displaced. Accordingly, the tactile notification portion 353 arranged on the reference line extending from the present position of the input boundary line 76 recedes to be parallel to the surface of the surrounding portion 34, and a tactile notification portion 355 arranged on a reference line extending from the input boundary line 76, which is displaced from the present position to a new position, protrudes from the surface of the surrounding portion 34. In this case, the tactile notification portion 355 arranged on the reference line extending from the new position of the input boundary line 76 is adjacent to the driver seat. That is, the new position of the input boundary line 76 is adjacent to the driver seat. Further, the first display window 61, which is set as the selected display window 69, is enlarged to cover an entire region of the screen panel 52. With this configuration, the user can select the target icon 63 included in the selected display window 69, which is the first display window 61, by a manipulation on the enlarged first input region 74.

As shown in FIG. 5B and FIG. 5C, after the display mode is switched from the window selection mode to the first function selection mode, when the reduced second input region 75 is manipulated by the user, the selected display window 69 switches from the first display window 61 to the second display window 62. That is, the second display window 62 is set as the selected display window 69 when the reduced second input region 75 is manipulated after the selected display window 69 is set as the first display window 61. With this configuration, the display mode switches from the first function selection mode in which the first display window 61 is set as the selected display window 69 to the second function selection mode in which the second display window 62 is set as the selected display window 69. Further, a manipulation method of switching from the first function selection mode to the second function selection mode may include (i) moving the finger F on the touchpad panel 32 from the enlarged first input region 74 to the reduced second input region 75 and isolating the finger F from the reduced second input region 75, which is also referred to as a swipe, and (ii) tapping on the reduced second input region 75.

As shown in FIG. 5C, when the reduced second input region 75 is selected by the user, the reduced second input region 75 is enlarged and an enlarged second input region 175 is rearranged on the touchpad panel 32. That is, the reduced second input region 75 is resized to generate the enlarged second input region 175. Further, the enlarged first input region 74 is reduced to and a reduced first input region 174 is rearranged on the touchpad panel 32. That is, the enlarged first input region 74 is resized to generate the reduced first input region 174. Hereinafter, each of the reduced first input region 174 and the enlarged second input region 175 is also referred to as a resized input region 174, 175. By this configuration, the reduced first input region 174 and the enlarged second input region 175 are defined on the touchpad panel 32.

The position of the input boundary line 76 is displaced when the selected input region 79 changes from the first input region 71 to the second input region 72. Accordingly, the tactile notification portion 355 arranged on the reference line extending from the present position of the input boundary line 76 recedes to parallel to the surface of the surrounding portion 34, and a tactile notification portion 351 arranged on an reference line extending from the input boundary line 76, which is displaced from the present position to a new position, protrudes from the surface of the surrounding portion 34. In this case, the tactile notification portion 351 arranged on the reference line extending from the new position of the input boundary line 76 is adjacent to an assistant driver seat. That is, the new position of the input boundary line 76 is adjacent to the assistant driver seat. Further, the second display window 62, which is set as the selected display window 69, is enlarged to cover the entire region of the screen panel 52. With this configuration, the user can select the target icon 63 included in the selected display window 69, which is the second display window 62, by a manipulation on the enlarged second input region 175.

After the display mode is switched to one of the first function selection mode and the second select mode, when the touchpad panel 32 is not manipulated by the user for the predetermined time, the display mode switches back from the one of the first function selection mode and the second select mode to the window selection mode.

Figure 6:
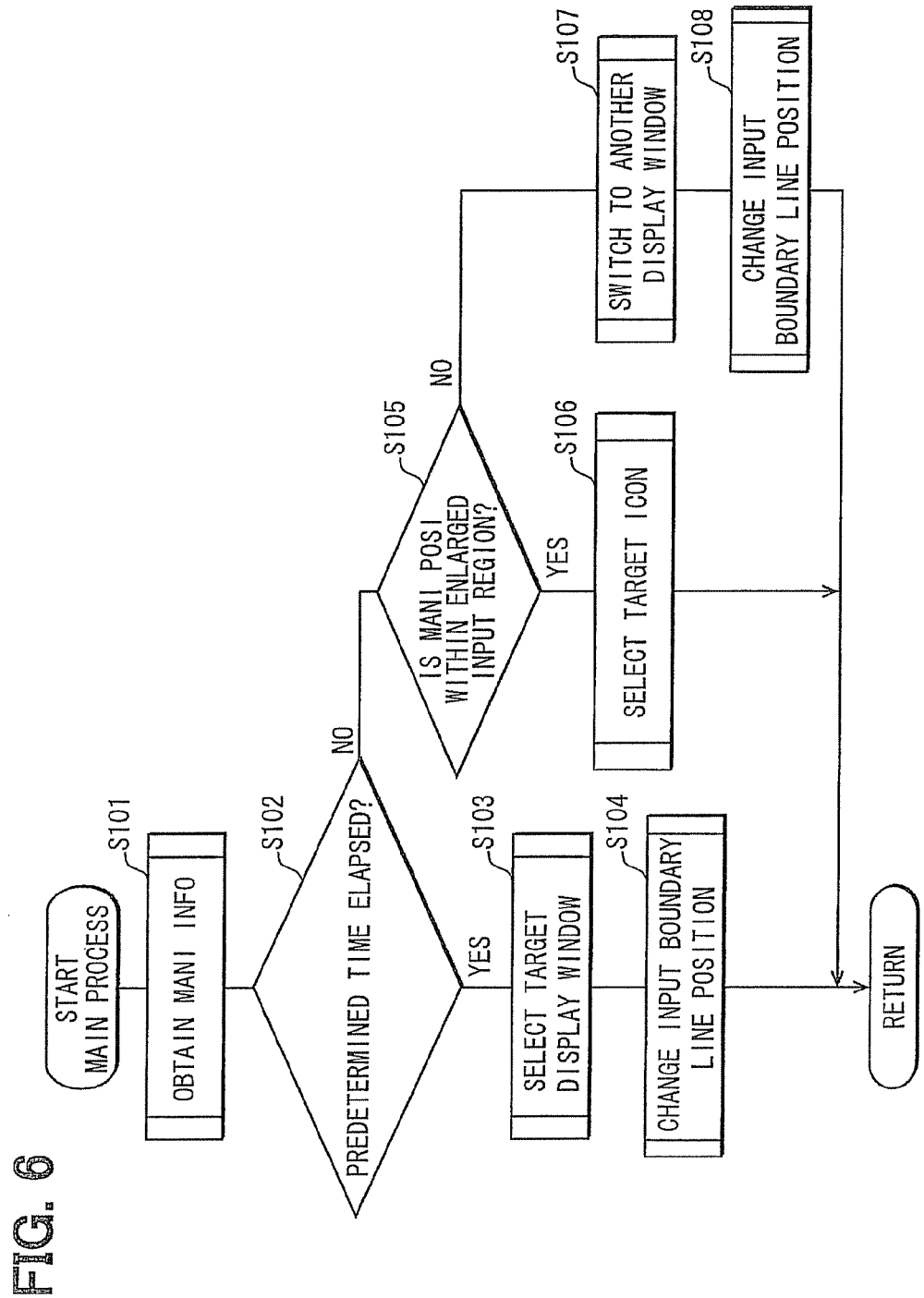
FIG. 6 is a flowchart showing a main process executed by a display controller of the display system according to the first embodiment.

The following will describe a switch process of the display mode with reference to FIG. 6. Hereinafter, the switch process of the display mode is also referred to as a main process. The display controller 53 executes the main process shown in FIG. 6 when the display mode is set as the window selection mode based on a manipulation by the user. Further, the display controller 53 executes, together with the main processes, a sub-process to reset the display mode to the window selection mode when the touchpad panel 32 is not manipulated by the user for the predetermined time after the window selection mode is switched to the function selection mode.

At S101, the display controller 53 obtains, from the manipulation apparatus 20, the manipulation information (MANI INFO), which includes the coordinates of the manipulation position manipulated by the user on the touchpad panel 32. Then, the display controller 53 proceeds to S102. At S102, the display controller 53 determines whether the predetermined time has elapsed from a previous manipulation. When the display controller 53 determines that the predetermined time has not elapsed from the previous manipulation, the display controller 53 proceeds to S105. At this time, the screen panel 52 is displayed in the function selection mode in which one of the display windows 61, 62 selected by the user is set as the selected display window 69. At S102, when the display controller 53 determines that the predetermined time has elapsed from the previous manipulation, the display controller 53 proceeds to S103. At a time when the display controller 53 determines that the predetermined time has elapsed from the previous manipulation at S102, the screen panel 52 has been already reset to the window selection mode by the sub-process executed by the display controller 53.

At S103, the display controller 53 sets the one of the display windows 60, which is selected by the user, as the selected display window 69, and switches the display mode from the window selection mode to the function selection mode based on the selected display window 69. At S104, the display controller 53 defines the enlarged first input region 74 and the reduced second input region 75 on the touchpad panel 32 by changing the position of the input boundary line 76 as shown in FIG. 5B. Further, the display controller 53 displays the selected display window 69 on the entire region of the screen panel 52. In this case the first display window 61 is set as the selected display window 69. Then, the display controller 53 returns to S101. Further, the display controller 53 transmits position displacement information, which indicates that the position of the input boundary line 76 is displaced from the present position to a new position, to the manipulation controller 33. When receiving the position displacement information, the manipulation controller 33 controls a corresponding actuator 37 to recede the currently protruded tactile notification portion 353 to be parallel to the surface of the surrounding portion 34. At the same time, the manipulation controller 33 controls another corresponding actuator 37 to protrude a tactile notification portion 35, which is arranged on a reference line extending from the new input boundary line 76, from the surface of the surrounding portion 34. Here, the new input boundary line 76 is an input boundary line 76 displaced from the present position to the new position.

At S105, the display controller 53 determines whether the coordinates of the manipulation position (MANI POST) included in the manipulation information are within a range of the enlarged first input region 74. At S105, when the display controller 53 determines that the coordinates of the manipulation position are out of the range of the enlarged first input region 74, that is the coordinates of the manipulation position are within a range of the reduced second input region 75, the display controller 53 proceeds to S107. At S105, when the display controller 53 determines that the coordinates of the manipulation position are within the range of the enlarged first input region 74, the display controller 53 proceeds to S106. At S106, the display controller 53 determines that the manipulation on the touchpad panel 32 is an icon selection manipulation. Here, the icon selection manipulation is defined as a manipulation which selects the target icon 63 included in the selected display window 69. Then, the display controller 53 displays, on the screen panel 52, an image, which indicates that the target icon 63 is in a selected state. Here, a position of the target icon 63 on the screen panel 52 corresponds to the manipulation position on the touchpad panel 32. Then, the display controller 53 returns to S101. More specifically, at S106, the display controller 53 converts the coordinates of the manipulation position on the touchpad panel 32 to coordinates of a corresponding position on the screen panel 52. Then, the display controller 53 determines the target icon 63 based on the coordinates of the corresponding position on the screen panel 52, sets a state of the target icon 63 as the selected state, and performs a predetermined operation linked to the target icon 63.

At S107, the display controller 53 changes the selected display window 69 from the first display window 61, which corresponds to the enlarged first input region 74, to the second display window 62, which corresponds to the reduced second input region 75. Thus, the first function selection mode in which the first display window 61 is set as the selected display window 69 is switched to the second function selection mode in which the second display window 62 is set as the selected display window 69. Then, the display controller 53 proceeds to S108. At S108, the display controller 53 defines the enlarged second input region 175 and the reduced first input region 174 on the touchpad panel 32 by changing the position of the input boundary line 76 as shown in FIG. 5C. Further, the display controller 53 displays the selected display window 69 on the entire region of the screen panel 52. In this case the selected display window 69 is set as the second display window 62. Then, the display controller 53 returns to S101. Further, the display controller 53 transmits the position displacement information of the input boundary line 76 to the manipulation controller 33. When receiving the position displacement information, the manipulation controller 33 controls a corresponding actuator 37 to recede the currently protruded tactile notification portion 355 to parallel to the surface of the surrounding portion 34, and controls a corresponding actuator 37 to protrude the tactile notification portion 351, which is arranged on the reference line extending from the new position of the input boundary line 76, from the surface of the surrounding portion 34.

In the present embodiment, in the window selection mode, the selected display window 69 is selected by manipulating one of the input regions 70 defined on the touchpad panel 32. Further, in the function selection mode, a target icon 63 is selected by manipulating one of the input regions 70 defined on the touchpad panel 32. Thus, when the display mode switches between the window selection mode and the function selection mode, the user can continuously select the target display window 69 and the target icon 63 on the touchpad panel 32. That is, in the window selection mode and the function selection mode, a manipulation object to be manipulated by the user is the same. Thus, the user has no need to switch the manipulation object when the display mode switches between the window selection mode and the function selection mode. Thus, a manipulation time to select the target display window 60 and the target icon 63 is reduced by simplifying the manipulation on the touchpad panel 32.

In the present embodiment, when the display mode is switched from the window selection mode to the function selection mode, the selected input region 79 is enlarged on the touchpad panel 32, and the enlarged first input region 74 or the enlarged second input region 175 is rearranged on the touchpad panel 32. With this configuration, a size of the selected input region 79 is enlarged compared with a case in which the selected input region 79 maintains as the same. Thus, the target icon 63 is easily and accurately selected by manipulating a corresponding position on the selected input region 79, which is enlarged. Thus, even when the size of the selected display window 69, which includes the target icon 63, is small on the screen panel 52, a manipulation time to select the target icon 63 is reduced.

As described above, the display system 100 reduces the manipulation time for selecting the target icon 63.

In the present embodiment, when the screen panel 52 displays the image for searching the destination in the window selection mode, the size of the second input region 72 is set smaller than the size of the first input region 71. With this configuration, the correspondence relationship between the display windows 60 and the input regions 70 is easy to be distinguished by the user. Thus, a wrong manipulation of selecting a display window 60 other than the target display window 60 is avoided.

Further, when the screen panel 52 displays the operation states of the in-vehicle apparatuses in the window selection mode, the size of the second input region 72 is set the same with the size of the first input region 71 irrespective of the sizes of the first display window 61 and the second display window 62. Thus, even when the size of the second display window 62 is substantially smaller than the first display window 61, the user can manipulate the second input region 72, which has a sufficient size, to select the second display window 62. With this configuration, a wrong manipulation of selecting a display window 60 other than the target display window 60 is avoided.

In the window selection mode, the arrangement of the input regions 70 defined on the touchpad panel 32 may be appropriately changed based on the arrangement of the display windows 60 displayed on the screen panel 52 and functions linked to the icons 63. With this configuration, a manipulation performance to select the target display window is improved and a manipulation time to select the target icon 63 is reduced.

In the present embodiment, after the display mode is switched from the window selection mode to the function selection mode, when the function selection mode is not manipulated for the predetermined time, the display mode is switched back to the window selection mode. Thus, when the user needs to select a next target icon 63 on a different display window 60 after a selection of the present target icon 63 on the present display window 60, a manipulation to switch the display mode from the function selection mode to the window selection mode can be skipped. With this configuration, in the display system 100 whose display modes include the window selection mode, a manipulation time is reduced by omitting a return manipulation from the function selection mode to the window selection mode.

In the present embodiment, when the screen panel 52 displays the operation states of the in-vehicle apparatuses in the window selection mode, a non-selected input region, which is defined as an input region other than the selected input region 79, is remained on the touchpad panel 32 in a reduced manner. For example, the size of the second input region 72 is reduced and the reduced second input region 75 is remained on the touchpad panel 32. Thus, in the window selection mode, when a wrong display window other than the target display window is selected, the user can manipulate on the reduced non-selected input region to correctly select the target display window. For example, in the present embodiment, when the first display window 61 is set as the selected display window 69 by a wrong manipulation on the first input region 71, the user can manipulate on the reduced second input region 75 to set the second display window 62 as the selected display window 69 and switches to the second function selection mode immediately. With this configuration, a manipulation to switch from the first function selection mode to the window selection mode is skipped by directly switching from the first function selection mode to the second function selection mode. Thus, in the display system 100 whose display modes include the window selection mode, when switching from one function selection mode to another function selection mode, a manipulation time is reduced by omitting a return manipulation from the one function, selection mode to the window selection mode Further, when the reduced second input region 75 is manipulated by the user, the reduced second input region 75 is enlarged and the enlarged second input region 175 is rearranged on the touchpad panel 32. Further, the enlarged first input region 74 is reduced, and the reduced first input region 174 is rearranged on the touchpad panel 32 together with the enlarged second input region 175. Thus, the user can continuously manipulate on the touchpad panel 32 to switch the display mode from the first function selection mode to the second function selection mode and select the target icon 63 included in the second display window 62 without changing the manipulation object. Thus, a manipulation time to switch the display mode and to select the target icon 63 is reduced by simplifying the manipulation.

In the present embodiment, when the screen panel 52 displays an image relative to a character input in the function selection mode, the first input region 71 is enlarged to cover the entire region of the touchpad panel 32 and the enlarged first input region 74 is rearranged on the touchpad panel 32. Thus, the size of the selected input region 79, which is the first input region 71, is enlarged compared with a case in which the selected input region 79 is maintained as the same. With this configuration, the target icon 63 is easily and accurately selected by manipulating on a corresponding position of the selected input region 79. Thus, a manipulation time to select the target icon 63 on the selected input region 79 is reduced.

In the present embodiment, the position of the input boundary line 76 between the first input region 71 and the second input region 72 is notified to the user by the tactile notification portions 35, which irritates a tactile sense of the user. Thus, the user has no need to focus on the touchpad panel 32 during a manipulation. That is, the user can manipulate on the input region 70, which corresponds to the target display window 60 by only focusing on the screen panel 52. With this configuration, a wrong manipulation is avoided, and the user can select the target display window 60 immediately with an assistance of the tactile notification portions 35. Thus, a manipulation time to select the target display window 60 is reduced by the tactile notification portions 35.

Further, when the position of the input boundary line 76 on the touchpad panel 32 is displaced from the present position to a new position by resizing the sizes of the input regions 70, the currently protruded tactile notification portion 35 recedes to parallel to the surface of the surrounding portion 34 and the corresponding tactile notification portion 35, which is arranged on the reference line extending from the new position of the input boundary line 76, protrudes from the surface of the surrounding portion 34. With this configuration, the protruded tactile notification portion 35 notifies the position of the input boundary line 76 on the touchpad panel 32 irrespective of the position of the display boundary line 66 on the screen panel 52. Thus, the tactile notification portions 35 avoid a wrong manipulation of selecting a display window 60 other than the target display window 60 in a real-time manner, thereby reducing a manipulation time on the touchpad panel 32.

In the present embodiment, the touchpad 31 may also operate as an input unit, the touchpad panel 32 may also operate as an input panel, the display controller 53 may also operate as a switch section and a resizing section, the icons 63 may also be referred to as button images, and the input boundary line 76 may also be referred to as a boundary line.

Second Embodiment

The following will describe a second embodiment of the present disclosure with reference to FIG. 7 and FIG. 8. In a display system 200 according to the present embodiment, a manipulation controller 33 of the manipulation apparatus 220 switches the display mode from the window selection mode to the function selection mode and rearrange an enlarged first input region 274 and the like. Further, when the screen panel 52 displays the operation states of the in-vehicle apparatuses in the window selection mode, a resizing of the first display window 61 and the second display window 62 is not performed similar to a case in which the screen panel 52 displays the image for searching the destination. The following will describe the window selection mode of the display system 200 according to the present embodiment with reference to FIG. 7. In the following description and in FIG. 7, the tactile notification portions 35, which have similar configurations and operate in a similar way to the tactile notification portions 35 described in the first embodiment, will be omitted.

As shown in FIG. 7A, in the window selection mode of the display system 200 according to the present embodiment, a first input region 271 has a size, which corresponds to a size of the first display window 61, and a second input region 272 has a size, which corresponds to a size of the second display window 62. Thus, a position of an input boundary line 276 on the touchpad panel 32 corresponds to the display boundary line 66 on the screen panel 52. In the window selection mode, when the user manipulates on the first input region 271 with the finger F, the first input region 271 is set as a selected input region 279. Further, the first display window 61, which corresponds to the first input region 271, is set as the selected display window 69. Then, the display mode of the screen panel 52 is switched from the window selection mode to the first function selection mode in which the first display window 61 is set as the selected display window 69.

As shown in FIG. 7B, when the display mode is switched from the window selection mode to the first function selection mode, the selected input region 279 is enlarged and the enlarged first input region 274 is rearranged on the touchpad panel 32. Further, the second input region 272, which is not selected by the user, is reduced to and a reduced second input region 275 is rearranged on the touchpad panel 32 together with the enlarged first input region 274. Hereinafter, an input region that is not selected by the user is also referred to as a non-selected input region, and a display window corresponding to the non-selected input region is also referred to as a non-selected display window. When the sizes of the first input region 271 and the second input region 272 are resized, the size of the first display window 61, which is set as the selected display window 69, and the size of the second display window 62, which is set as the non-selected display window, are maintained as the same on the screen panel 52.

Further, in the first function selection mode, when the user manipulates on the reduced second input region 275 with the finger F, the second display window 62 is set as the selected display window 69. Accordingly, the display mode switches from the first function selection mode in which the first display window 61 is set as the selected display window 69 to the second function display mode in which the second display window 62 is set as the selected display window 69.

As shown in FIG. 7C, when the display mode switches from the first function selection mode to the second function display mode, the reduced second input region 275 is enlarged and an enlarged second input region 375 is rearranged on the touchpad panel 32. Further, the enlarged first input region 274 is reduced and a reduced first input region 374 is rearranged on touchpad panel 32 together with the enlarged second input region 375. That is, when the reduced second input region 275 is manipulated by the user in the first function selection mode, the sizes of the first input region 271 and the second input region 272 are resized again so that the reduced first input region 374 and the enlarged second input region 375 are rearranged on the touchpad panel 32. At this time, the size of the first display window 61, which is set as the non-selected display window, and the size of the second display window 62, which is set as the selected display window 69, are maintained as the same on the screen panel 52. With this configuration, the user can manipulate on the enlarged second input region 375 to select the target icon 63 included in the second display window 62. Further, after the display mode is switched from the first function selection mode to the second function selection mode, when the touchpad panel 32 is not manipulated for the predetermined time, the display mode switches from the second function selection mode to the window selection mode as shown in FIG. 7A.

The following will describe a switch process of the display mode in the display system 200 according to the present with reference to FIG. 8. Hereinafter, the switch process of the display mode is also referred to as a main process. The manipulation controller 33 executes the main process shown in FIG. 8 when the display mode is set as the window selection mode based on a manipulation by the user. Further, the manipulation controller 33 executes, together with the main process, a sub-process to reset the display mode to the window selection mode when the touchpad panel 32 is not manipulated by the user for the predetermined time after the window selection mode is switched to the function selection mode.

At S201, the manipulation controller 33 detects the coordinates of the manipulation position on the touchpad panel 32, and proceeds to S202. At S202, the manipulation controller 33 determines whether the predetermined time has elapsed from a previous detection of the manipulation on the touchpad panel 32. At S202, when the manipulation controller 33 determines that the predetermined time has not elapsed from the previous detection of the manipulation, the manipulation controller 33 proceeds to S205. At this time, the screen panel 52 is displayed in the function selection mode in which one of the display windows 61, 62 is set as the selected display window 69. At S202, when the manipulation controller 33 determines that the predetermined time has elapsed from the previous detection of the manipulation, the manipulation controller 33 proceeds to S203. At a time when the manipulation controller 33 determines that the predetermined time has elapsed from the previous manipulation at S202, the screen panel 52 has been already reset to the window selection mode by the sub-process, which is executed by the manipulation controller 33.

At S203, the manipulation controller 33 sets the one of the display windows 61, 62, which is selected by the user, as the selected display window 69, based on the detected coordinates of the manipulation position. In a case shown in FIG. 7A to 7C, since the first input region 271 is manipulated by the user, the first input region 271 is set as the selected input region 279. Further, the first display window 61, which corresponds to the first input region 271, is set as the selected display window 69. Then, the manipulation controller 33 transmits an instruction including information of the selected display window 69 to the display controller 53, and proceeds to S204. Then, the display mode is switched from the window selection mode to the function selected mode in which the selected display window 69 is displayed in an enlarged manner. In the case shown in FIG. 7A, the first display window 61 is set as the selected display window 69. At S204, the manipulation controller 33 resizes the sizes of the first input region 271 and the second input region 272 to rearrange the enlarged first input region 274 and the reduced second input region 275. That is, the manipulation controller 33 defines the enlarged first input region 274 and the reduced second input region 275 on the touchpad panel 32 by changing the position of the input boundary line 276 as shown in FIG. 7B. Then, the manipulation controller 33 returns to S201.

At S205, the manipulation controller 33 determines whether the coordinates of the manipulation position are within a range of the enlarged first input region 274. At S205, when the manipulation controller 33 determines that the coordinates of the manipulation position are out of the range of the enlarged first input region 274, that is the coordinates of the manipulation position are within a range of the reduced second input region 275, the manipulation controller 33 proceeds to S207. At S205, when the manipulation controller 33 determines that the coordinates of the manipulation position are within the range of the enlarged first input region 274, the manipulation controller 33 proceeds to S206. At S206, the manipulation controller 33 determines that the manipulation on the touchpad panel 32 is an icon selection manipulation. Here, the icon selection manipulation is defined as a manipulation which selects the target icon 63 included in the selected display window 69. More specifically, at S206, the manipulation controller 33 converts the coordinates of the manipulation position on the enlarged first input region 274 of the touchpad panel 32 to coordinates of a corresponding position on the selected display window 69 of the screen panel 52. Then, the manipulation controller 33 transmits the manipulation information including the coordinates of the position on the selected display window 69, which correspond to the coordinates of the manipulation position on the enlarged first input region 274, to the display controller 53. When receiving the manipulation information, the display controller 53 determines a target icon 63 based on the coordinates of the position on the selected display window 69, which are transmitted from the manipulation controller 33. Then, the display controller 53 sets a state of the target icon 63 as the selected state, and performs a predetermined operation linked to the target icon 63.

At S207, the manipulation controller 33 switches the display mode from the first function selection mode in which the first display window 61 is set as the selected display window 69 to the second function selection mode in which the second display window 62 is set as the selected display window 69. Specifically, the manipulation controller 33 switches the non-selected display window, which is the second display window 62, to the selected display window 69 when the non-selected input region, which is the reduced second input region 275, is manipulated. Then, the manipulation controller 33 transmits an instruction, which notifies the selected display window 69 after the switch of the display mode, to the display controller 53, and proceeds to S208. At S208, the manipulation controller 33 defines the reduced first input region 374 and the enlarged second input region 375 on the touchpad panel 32 by changing the position of the input boundary line 276 as shown in FIG. 7C, and returns to S201.

In the present embodiment, the user can continuously manipulate on the touchpad panel 32 to select the target display window 60 and, the target icon 63. Thus, a manipulation time to select the target icon 63 is reduced. Further, advantages, which are similar to the advantages provided by the display system 100 according to the first embodiment, are provided by the display system 200 according to the present embodiment.

In the present embodiment, the touchpad 231 may also operate as the input unit, the manipulation controller 33 may also operate as the switch section and the resizing section, and the input boundary line 276 may also be referred to as the boundary line.

The following will describe a modification of the display system 200 according to the present embodiment. In the display system 200 according to the present embodiment, the manipulation controller 33 of the manipulation apparatus 220 switches the display mode from the window selection mode to the function selection mode and rearrange an enlarged first input region 274 and the like. Alternatively, the manipulation apparatus 220 may further include the display controller 53 to function as a function selection apparatus. The following will describe a configuration of the function selection, apparatus, which selects a target button image from a plurality of button images displayed on the screen panel 52.

The function selection apparatus includes the touchpad 231, the display controller 53, and the manipulation controller 33. The button images displayed on the screen panel 52 are classified into two or more groups of button images, and each of the button images is linked to a corresponding predetermined function. The touchpad 231 is arranged apart from the screen panel 52, and receives manipulation information when the touchpad 231 is touched by the user. The display controller 53 controls the screen panel 52 to display two or more display windows, each of which includes a corresponding group of the button images. The manipulation controller 33 detects the manipulation information received by the touchpad 231. The manipulation controller 33 further includes a first defining section, a second defining section and a determination section. The first defining section determines, on the touchpad 231, an arrangement of window input regions. Each of the window input regions is touched by the user for selecting a corresponding display window from the display windows displayed on the screen panel 52. One of the window input regions touched by the user is referred to as a selected window input region, and one of the display windows corresponding to the selected window input region is referred to as a selected display window. When the one of the window input regions is touched by the user, the second defining section extracts one of the groups of the button images included in the selected display window based on the manipulation information received by the touchpad 231 and switches the arrangement of the window input regions on the touchpad 231 to an arrangement of a plurality of function input regions. Each of the function input regions is touched by the user for selecting one of the button images included in the selected display window. The determination section determines whether the one of the button images included in the selected display window is selected by the user.

In the present modification, when a predetermined time has elapsed after the second defining section switched the arrangement of the window input regions on the touchpad 231 to the arrangement of the function input regions, the first defining section determines the arrangement of the window input regions again on the touchpad 231.

Further, when the second defining section of the manipulation controller 33 extracts the one of the groups of the button images included in the selected display window, the display controller 53 enlarges a size of the selected display window and controls the screen panel 52 to display the selected display window whose size is enlarged.

Other Embodiments

Generally, a display system 100, 200 includes a display apparatus 40 and a manipulation apparatus 20, 220 and the like. In the first embodiment, the display controller 53 switches the display mode from the window selection mode to the function selection mode, and defines the enlarged input region and the like. In the second embodiment, the manipulation controller 33 switches the display mode from the window selection mode to the function selection mode, and defines the enlarged input region and the like. Thus, in the display system 100, 200, the switch section may be provided by the display controller 53 included in the display apparatus 40 or the manipulation controller 33 included in the manipulation apparatus 20, 220. Similarly, the resizing section may be provided by the display controller 53 included in the display apparatus 40 or the manipulation controller 33 included in the manipulation apparatus 20, 220. Further, the switch section and the resizing section may be provided by a cooperative operation of the display controller 53 and the manipulation controller 33. Further, the display system 100, 200 may include a circuit or an apparatus, which is separate from the display controller 53 and the manipulation controller 33 and provides the above-described functions achieved by the switch section and the resizing section. Further, above-described functions of the controller, circuit unit, and the apparatus may be provided by an execution of a program. Alternatively, the above-described functions of the controller, circuit unit, and the apparatus may be provided by a method other than the execution of a program.

In the foregoing embodiments, two display windows 61, 62 are displayed on the screen panel 52 in the horizontal direction. Alternatively, the number of the display windows and an arrangement of the display windows may be set in a manner other than the above-described manner. For example, display windows may be arranged on the screen panel 52 in a vertical direction. Further, more than two display windows may be displayed on the screen panel 52.

In the first embodiment, during the screen panel 52 displays the operations states of the in-vehicle apparatuses in the window selection mode, when the first input region 71 is manipulated, the second input region 72 is remained on the touchpad panel 32 and the second display window 62, which corresponds to the second input region 72, is not displayed on the screen panel 52. Alternatively, when the first input region 71 is manipulated, the second display window 62, which corresponds to the second input region 72, may be displayed on the screen panel 52 in a reduced manner.

In the foregoing embodiments, after the display mode switches from the window selection mode to the function selection mode, when the touchpad panel 32 is not manipulated for the predetermined time, the display mode switches back to the window selection mode. In this case, the predetermined time may be changeable. Further, when the function selection mode is not manipulated for the predetermined time, the display mode may maintain in the function selection mode without a switchback. Alternatively, whether to switch back the function selection mode to the window selection mode when the function selection mode is not manipulated for the predetermined time may be determined based on a type of an image, which is displayed on the screen panel 52 in the function selection mode.

In the foregoing embodiments, one of the tactile notification portions 35, which is arranged on the reference line extending from the input boundary line 76, 276 is protruded from the surface of the surrounding portion 34 of the touchpad panel 32. Further, the touchpad 31, 231 may include a tactile notification portion 35, which is movable along the surrounding portion 34 of the touchpad panel 32 so that the tactile notification portion 35 is arranged on the reference line extending from the input boundary line 76, 276 when the position of the input boundary line 76, 276 is displaced. Further, a predetermined number of the tactile notification portions 35 may be preliminarily arranged at predetermined positions, which are placed on the reference lines of the possible positions of the input boundary line 76, 276. In the foregoing embodiments, the tactile notification portions 35 protrude from five different positions. Alternatively, the number of the positions from which the tactile notification portions 35 protrude may be set appropriately based on the number of the display windows.

In the foregoing embodiments, the capacitance-based touchpad 31, 231 operates as the input unit. Further, a resistive touchpad may also operate as the input unit.

In the foregoing embodiments, the display unit 51 is provided by the LCD unit. Further, the display unit 51 may be provided by a plasma display unit or an organic light-emitting diode display unit. Further, a head-up display apparatus may operate as the display apparatus 40. Specifically, the head-up display apparatus may include a windshield and a combiner, which operate as the screen panel 52, and a projector, which projects an image on the windshield and the combiner so that the head-up display apparatus functions as the display apparatus 40 in the present embodiment. In this case, the combiner is arranged at an upper side of the instrument panel.

The above disclosure has the following aspects.

According to a first aspect of the present disclosure, a display system includes a screen panel, an input unit, a switch section, and a resizing section. The screen panel switches a display mode between a window selection mode and a function selection mode. The screen panel displays a plurality of display windows in the window selection mode for a selection of a target display window from the display windows, and displays a plurality of button images included in the target display window in the function selection mode for a selection of a target button image from the button images. Each of the button images is linked to a corresponding predetermined function. The input unit includes an input panel that is arranged apart from the screen panel. The input panel defines an arrangement of a plurality of input regions. The arrangement of the input regions corresponds to an arrangement of the display windows in the window selection mode. One of the input regions that corresponds to the target display window is referred to as a target input region. When the target input region is manipulated by a user, the switch section sets the target input region as a selected input region, sets the target display window as a selected display window, and switches the display mode from the window selection mode to the function selection mode in which the target display window is set as the selected display window. The resizing section enlarges a size of the selected input region on the input panel, and rearranges an enlarged selected input region on the input panel when the switch section switches the display mode from the window selection mode to the function selection mode.

In the above display system, in the window selection mode, the target display window is selected by manipulating the target input region defined on the input panel. Further, in the function selection mode, the target button image is selected by manipulating the selected input region defined on the input panel. Thus, when the display mode switches between the window selection mode and the function selection mode, the user can continuously select the target display window and the target button image on the input panel. That is, in the window selection mode and the function selection mode, a manipulation object to be manipulated by the user to select the target display window and the target button image is the same. Thus, the user has no need to switch the manipulation object when the display mode switches between the window selection mode and the function selection mode. Thus, a manipulation time to select the target display window and the target button image is reduced by simplifying the manipulation on the input panel.

Further, when the display mode switches from the window selection mode to the function selection mode, the size of the selected input region is enlarged and the enlarged selected input region is rearranged on the input panel. With this configuration, the size of the selected input region is enlarged compared with a case in which the selected input region maintains as the same. Thus, the target button image is easily and accurately selected by manipulating a corresponding position on the enlarged selected input region. Thus, even when a size of the selected display window, which includes the target button image, is small on the screen panel, a manipulation time to select the target button image is reduced.

As described above, the display system reduces the manipulation time for selecting the target button image.

Further, the display windows may include a first display window and a second display window, and the input regions may include a first input region and a second input region respectively corresponding to the first display window and the second display window. In the window selection mode, the second display window may have a size smaller than a size of the first display window and may be displayed on the screen panel together with the first display window, and the input unit may define an arrangement of the first input region and the second input region on the input panel such that the second input region has a size smaller than a size of the first input region. With this configuration, the correspondence relationship between the display windows and the input regions is easy to be distinguished by the user. Thus, a wrong manipulation of selecting a display window other than the target display window is avoided.

Further, the display windows may include a first display window and a second display window, and the input regions may include a first input region and a second input region respectively corresponding to the first display window and the second display window. In the window selection mode, the second display window may have a size smaller than a size of the first display window and may be displayed on the screen panel together with the first display window, and the input unit may define an arrangement of the first input region and the second input region on the input panel such that the first input region has a size equal to a size of the second input region irrespective of the sizes of the first display window and the second display window. With this configuration, even when the size of the second display window is substantially smaller than the size of the first display window, the user can manipulate the second input region, which has a sufficient size, to select the second display window. Thus, a wrong manipulation of selecting a display window other than the target display window having the substantially smaller size is avoided, and accordingly, a manipulation time to select the target display window is reduced.

Further, in the window selection mode, the arrangement of the input regions defined on the input panel may be appropriately changed based on the arrangement of the display windows displayed on the screen panel and functions linked to the button images. With this configuration, a manipulation performance to select the target display window is improved and a manipulation time to select the target button image is reduced.

Further, when a predetermined time has elapsed after the switch section switched the display mode from the window selection mode to the function selection mode, the switch section may switch the display mode from the function selection mode to the window selection mode. With this configuration, when the user needs to select a next target button image on a different display window after a selection of the present target button image on the present display window, a manipulation to switch the display mode from the function selection mode to the window selection mode can be skipped. Thus, in the display system whose display modes include the window selection mode, a manipulation time is reduced by omitting a return manipulation from the function selection mode to the window selection mode.

Further, one of the display windows other than the target display window may be referred to as a non-target display window, and one of the input regions corresponding to the non-target display window may be referred to as a non-target input region. When the target input region is manipulated by the user, the non-target input region may be set as a non-selected input region and the non-target display window may be set as a non-selected display window. When the switch section switches the display mode from the window selection mode to the function selection mode, the resizing section may reduce a size of the non-selected input region on the input panel, and may rearrange a reduced non-selected input region on the input panel together with the enlarged selected input region. When the reduced non-selected input region is manipulated by the user after the switch mode switches from the window selection mode to the function selection mode, the switch section may set the reduced non-selected input region as the selected input region, may set the enlarged selected input region as the non-selected input region, may set the non-target display window corresponding to the reduced non-selected input region as the selected display window, may set the target display window corresponding to the enlarged selected input region as the non-selected display window, and may switch the display mode to a function selection mode in which the non-target display window corresponding to the reduced non-selected input region is set as the selected display window. With this configuration, when the screen panel displays the operation states of the in-vehicle apparatuses in the window selection mode, the non-selected input region is remained on the touchpad panel in a reduced manner. Thus, in the window selection mode, when a wrong display window other than the target display window is selected, the user can manipulate on the reduced non-selected input region to correctly select the target display window. Thus, a manipulation to switch from the function selection mode to the window selection mode is skipped by directly switching from one function selection mode to another function selection mode. Thus, in the display system whose display modes include the window selection mode, a manipulation time is reduced by simplifying the manipulation to switch the display mode from one function selection mode to another function selection mode.

Further, when the switch section switches the display mode to the function selection mode in which the non-target display window corresponding to the reduced non-selected input region is set as the selected display window, the resizing section may enlarge a size of the reduced non-selected input region and may reduce a size of the enlarged selected input region. With this configuration, the user can continuously manipulate on the input panel to switch the display mode from one function selection mode to another function selection mode and select the target button image included in the selected display window without changing the manipulation object. Thus, a manipulation time to switch the display mode and to select the target button image is reduced by simplifying the manipulation on the input panel.

Further, the resizing section may enlarge the size of the selected input region, and may rearrange the enlarged selected input region on an entire region of the input panel when the switch section switches the display mode to the function selection mode. With this configuration, the size of the selected input region is enlarged compared with a case in which the selected input region is maintained as the same. Thus, the target button image is easily and accurately selected by manipulating on a corresponding position of the selected input region and a manipulation time to select the target button image is reduced.

Further, the input unit may further include a plurality of tactile notification portions arranged at a surrounding portion of the input panel. Each of the tactile notification portions may be controlled to either protrude from a surface of the surrounding portion or recede to be parallel to the surface of the surrounding portion. One of the tactile notification portions, which is positioned on a reference line extending from a boundary line between adjacent two of the input regions, may protrude from the surface of the surrounding portion. With this configuration, the position of the boundary line between the adjacent two input regions is notified to the user by the tactile notification portions, which irritate a tactile sense of the user. Thus, the user has no need to focus on the input panel during a manipulation on the input panel. That is, the user can manipulate the target input region by only focusing on the screen panel. Thus, a wrong manipulation is avoided, and the user can select the target display window immediately with an assistance of the tactile notification portions. Thus, a manipulation time to select the target display window is reduced by the tactile notification portions.

Further, when the boundary line is displaced from a present position to a new position by resizing sizes of the input regions, the tactile notification portion, which is arranged on the reference line extending from the boundary line positioned at the present position, may recede to be parallel to the surface of the surrounding portion and another tactile notification portion, which is arranged on a reference line extending from the boundary line positioned at the new position, may protrude from the surface of the surrounding portion. With this configuration, the tactile notification portion, which is protruded, notifies the position of the boundary line on the input panel in real time. Thus, a wrong manipulation of selecting a display window other than the target display window is avoided in a real-time manner, thereby reducing a manipulation time on the input panel.

According to a second aspect of the present disclosure, a display apparatus included in the display system according to the first aspect includes the screen panel, the switch section, and the resizing section.

In the above display apparatus, advantages similar to the advantages provided by the display system according to the first aspect are provided.

According to a third aspect of the present disclosure, a manipulation apparatus included in the display system according to the first aspect includes the input panel, the switch section, and the resizing section.

In the above manipulation apparatus, advantages similar to the advantages provided by the display system according to the first aspect are provided.

According to a fourth aspect of the present disclosure, a function selection apparatus includes a touchpad, a display controller, and a manipulation controller. The function selection apparatus selects a target button image from a plurality of button images displayed on a screen panel. The button images are classified into a plurality of groups of button images and each button image is linked to a corresponding predetermined function. The touchpad is arranged apart from the screen panel and receives manipulation information when the touchpad is touched by a user. The display controller controls the screen panel to display a plurality of display windows. Each of the display windows includes a corresponding group of the button images. The manipulation controller detects the manipulation information received by the touchpad. The manipulation controller includes a first defining section, a second defining section, and a determination section. The first defining section determines an arrangement of a plurality of window input regions on the touchpad. Each of the window input regions is touched for selecting a corresponding display window from the display windows displayed on the screen panel. One of the window input regions that is touched by the user is referred to as a selected window input region and one of the display windows that corresponds to the selected window input region is referred to as a selected display window. When the one of the window input regions is touched by the user, the second defining section extracts one of the groups of the button images included in the selected display window based on the manipulation information received by the touchpad and switches the arrangement of the window input regions on the touchpad to an arrangement of a plurality of function input regions. Each of the function input regions is touched for selecting one of the button images included in the selected display window. The determination section determines whether the one of the button images included in the selected display window is selected by the user.

In the above function selection apparatus, advantages similar to the advantages provided by the display system according to the first aspect are provided.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A display system having a state being one of a window selection mode for selecting one of a plurality of display windows defined on a screen panel and a function selection mode for selecting one of a plurality of button images displayed on the one of the plurality of display windows that is selected in the window selection mode, each one of the plurality of button images being linked to a corresponding predetermined function, the display system comprising:
   an input device including an input panel that is arranged apart from the screen panel, the input device defining a plurality of input regions on the input panel in the window selection mode, an arrangement of the plurality of input regions corresponding to an arrangement of the plurality of display windows defined on the screen panel;
   a switch device, based on a manipulation made by a user on one of the plurality of input regions in the window selection mode, the switch device:
      setting the one of the plurality of input regions as a selected input region;
      setting the display window corresponding to the selected input region as a selected display window; and
      switching the state of the display system from the window selection mode to the function selection mode related to the selected display window; and
   a region enlarging device, when the state of the display system is switched from the window selection mode to the function selection mode by the switch device, defining an enlarged input region on the input panel by enlarging a size of the selected input region while maintaining a relative positional arrangement correspondence between the plurality of display windows and the plurality of input regions, each of the plurality of display windows corresponding to one of the plurality of input regions of the input device after the size of the selected input region is enlarged, the enlarged input region receiving a manipulation made by the user for selecting a specific one of the plurality of button images included in the selected display window in the function selection mode, wherein
   the region enlarging device defines the enlarged input region on the input panel in response to the manipulation made by the user on the one of the plurality of input regions regardless of a size of the selected display window.

2. The display system according to claim 1,
   wherein, in the window selection mode, a first display window and a second display window are defined on the screen panel as the display windows and the second display window has a size smaller than a size of the first display window, and
   wherein, in the window selection mode, the input device defines the input region corresponding to the first display window as a first input region and defines the input region corresponding to the second display window as a second input region, and defines the first input region and the second input region on the input panel such that the second input region has a size smaller than a size of the first input region.

3. The display system according to claim 1,
   wherein, in the window selection mode, a first display window and a second display window are defined on the screen panel as the display windows and the second display window has a size smaller than a size of the first display window, and
   wherein, in the window selection mode, the input device defines the input region corresponding to the first display window as a first input region and defines the input region corresponding to the second display window as a second input region, and defines the first input region and the second input region on the input panel such that the first input region has a size equal to a size of the second input region.

4. The display system according to claim 1,
   wherein, when a predetermined time has elapsed after the state of the display system is switched from the window selection mode to the function selection mode, the switch device switches the state of the display system from the function selection mode to the window selection mode.

5. The display system according to claim 1,
   wherein, when the state of the display system is switched from the window selection mode to the function selection mode by the switch device, the region enlarging device reduces a size of the input region that is not selected, and defines a reduced input region, which is reduced from the input region that is not selected, on the input panel together with the enlarged input region, and
   wherein, based on an input to the reduced input region in the function selection mode related to the selected display window that corresponds to the enlarged input region, the switch device:
      sets the display window corresponding to the reduced input region as the selected display window; and switches the state of the display system to a different function selection mode related to the selected display window that corresponds to the reduced input region.

6. The display system according to claim 5,
wherein, when the state of the display system is switched from the function selection mode to the different function selection mode related to the selected display window that corresponds to the reduced input region, the region enlarging device defines the enlarged input region on the input panel by enlarging a size of the reduced input region.

7. The display system according to claim 1,
wherein, when the state of the display system is switched to the function selection mode by the switch device, the region enlarging device defines the enlarged input region on an entire region of the input panel.

8. The display system according to claim 1,
wherein the input device further includes a plurality of tactile notification portions arranged at a surrounding portion of the input panel, each of the tactile notification portions is controlled to either protrude from a surface of the surrounding portion or recede to be parallel to the surface of the surrounding portion, and
wherein one of the tactile notification portions, which is positioned on a reference line extending from a boundary line between adjacent two of the input regions, is protruded from the surface of the surrounding portion.

9. The display system according to claim 8,
wherein, when the boundary line is displaced from a present position to a new position by resizing sizes of the input regions, the tactile notification portion, which is arranged on the reference line extending from the boundary line positioned at the present position, recedes to be parallel to the surface of the surrounding portion and another tactile notification portion, which is arranged on a reference line extending from the boundary line positioned at the new position, protrudes from the surface of the surrounding portion.

10. The display system according to claim 1, wherein
in response to the manipulation made by the user on the one of the input regions and the state of the display system is switched from the window selection mode to the function selection mode by the switch device, the region enlarging device enlarges the size of the selected input region while maintaining the size of the selected display window displayed on the screen panel.

11. The display system according to claim 1, wherein the screen panel, the switch device and the region enlarging device are combined to define a display apparatus.

12. The display system according to claim 1, wherein the input panel, the switch device and the region enlarging device are combined to define a manipulation apparatus.

13. The display system according to claim 1, wherein the enlarged input region on the input panel covers the entire input panel.

14. The display system according to claim 1,
wherein the input device further includes a plurality of tactile notification portions arranged at a surrounding portion of the input panel, each of the tactile notification portions having a movable portion that is controlled to either protrude from a surface of the surrounding portion or recede to be parallel to the surface of the surrounding portion, and
wherein the movable portion of one of the tactile notification portions, which is positioned on a reference line extending from a boundary line between adjacent two of the input regions, is protruded from the surface of the surrounding portion.

15. A display apparatus utilized in a display system, the display system having a state being one of a window selection mode for selecting one of a plurality of display windows and a function selection mode for selecting one of a plurality of button images displayed on the one of the plurality of display windows that is selected in the window selection mode, each one of the plurality of button images being linked to a corresponding predetermined function, the display apparatus comprising:
a screen panel displaying the one of the plurality of display windows and the plurality of button images;
a switch device, in response to a manipulation made by a user on one of a plurality of input regions defined on an input panel of an input device in the window selection mode,
setting the one of the plurality of input regions as a selected input region, the input panel being disposed apart from the screen panel and being communicative with the display apparatus, an arrangement of the plurality of input regions corresponding to an arrangement of the one of the plurality of display windows;
setting the display window corresponding to the selected input region as a selected display window; and
switching the state of the display system from the window selection mode to the function selection mode related to the selected display window; and
a region enlarging device, when the state of the display system is switched from the window selection mode to the function selection mode by the switch device, defining an enlarged input region on the input panel by enlarging a size of the selected input region while maintaining a relative positional arrangement correspondence between the plurality of display windows and the plurality of input regions, each of the plurality of display windows corresponding to one of the plurality of input regions of the input device after the size of the selected input region is enlarged, the enlarged input region receiving a manipulation made by a user for selecting a specific one of the plurality of button images included in the selected display window,
wherein
the region enlarging device defines the enlarged input region on the input panel in response to the manipulation made by the user on the one of the plurality of input regions regardless of a size of the selected display window.

16. A manipulation apparatus utilized in a display system, the display system having a state being one of a window selection mode for selecting one of a plurality of display windows defined on a screen panel of a display apparatus and a function selection mode for selecting one of a plurality of button images displayed on the one of the plurality of display windows that is selected in the window selection mode, each one of the plurality of button images being linked to a corresponding predetermined function, the manipulation apparatus comprising:
an input panel disposed apart from the screen panel, the input panel defining a plurality of input regions in the window selection mode, an arrangement of the plurality of input regions corresponding to an arrangement of the one of the plurality of display windows;

a switch device, in response to a manipulation made by a user on one of the plurality of input regions in the window selection mode,
- setting the one of the plurality of input regions as a selected input region;
- setting the one of the plurality of display windows corresponding to the selected input region as a selected display window; and
- switching the state of the display system from the window selection mode to the function selection mode related to the selected display window; and a region enlarging device, when the state of the display system is switched from the window selection mode to the function selection mode by the switch device, defining an enlarged input region on the input panel by enlarging a size of the selected input region while maintaining a relative positional arrangement correspondence between the plurality of display windows and the plurality of input regions, each of the plurality of display windows corresponding to one of the plurality of input regions of the input panel after the size of the selected input region is enlarged, the enlarged input region receiving a manipulation made by a user for selecting a specific one of the plurality of button images included in the selected display window, when the region enlarging device defines the enlarged input region on the input panel in response to the manipulation made by the user on the one of the plurality of input regions regardless of a size of the selected display windows.

* * * * *